United States Patent [19]
Webb et al.

[11] Patent Number: 6,045,336
[45] Date of Patent: Apr. 4, 2000

[54] PUMP AND VALVE FOR LEACHATE EXTRACTION OF HEAVIER THAN WATER FLUIDS

[75] Inventors: Richard T. Webb, Pleasant Hill; Thomas H. Hitchcock, Oakland, both of Calif.

[73] Assignee: Clean Environment Engineers, Inc., Oakland, Calif.

[21] Appl. No.: 09/069,051

[22] Filed: Apr. 28, 1998

[51] Int. Cl.[7] .............................. F04F 1/08; F16K 31/26; E03B 5/06

[52] U.S. Cl. ........................ 417/131; 417/126; 210/170; 137/393; 137/434

[58] Field of Search ..................................... 417/126, 128, 417/130, 131, 40, 41, 101; 210/170, 747, 923; 137/393, 429, 434

[56] References Cited

U.S. PATENT DOCUMENTS

| | | | |
|---|---|---|---|
| 4,663,037 | 5/1987 | Breslin | 210/170 |
| 5,004,405 | 4/1991 | Breslin | 417/126 |
| 5,358,038 | 10/1994 | Edwards et al. | 417/126 |
| 5,495,890 | 3/1996 | Edwards et al. | 417/126 |
| 5,641,272 | 6/1997 | Harrold | 417/131 |
| 5,662,460 | 9/1997 | Modesitt | 417/131 |

*Primary Examiner*—Willis R. Wolfe
*Attorney, Agent, or Firm*—Townsend and Townsend and Crew LLP

[57] ABSTRACT

In combination with a pump, a valve for operation at the interface between underlying heavier liquid and overlying lighter liquid is disclosed. The valve includes an inlet within the heavier liquid communicated from a valve seat to a conduit which typically is connected to the inlet of a pump. A valve disc opens and closes the valve seat to admit the heavier liquid to flow to the pump. The pump is preferably pneumatic and of the type which when flooded with liquid, automatically undertakes pumping and when empty of liquid ceases pumping. A buoyant member having a specific density between that of the lighter liquid and the heavier liquid is buoyantly supported at the interface and moves with the interface. This buoyant member is connected to an assembly which actuates the valve. Where lighter liquid is predominantly present, the float sinks and closes the valve preventing pumping. Where heavier liquid is predominantly present, the float rises, opens the pump inlet to permit pumping. Specific mechanisms are present for valve operation including a surrounding casing for protecting the valve from debris and a rocker arm arrangement for valve operation.

10 Claims, 4 Drawing Sheets

6,045,336

PUMP AND VALVE FOR LEACHATE EXTRACTION OF HEAVIER THAN WATER FLUIDS

This invention relates to a valve and to a pump connected to the valve for pumping leachate have a specific gravity greater than that of water.

BACKGROUND OF THE INVENTION

Pneumatic pumps are known which can extract from the top of water tables lighter than water contaminants. For example see U.S. Pat. No. 5,004,405, issued Apr. 2, 1991, entitled "Pneumatically Powered Submersible Fluids Pump with Integrated controls." For the purpose of this disclosure this patent is incorporated by reference therein as if fully set forth.

In situations involving the relatively slow accumulation of surface contaminants, such pneumatic pumps are usually superior to pumps of the electric variety. For example, a pneumatic pump can intermittently stop and start easily; electric pumps which are called upon to intermittently stop and start frequently burn out or otherwise fail. Additionally, pneumatic pumps generally are superior in handling particulate matter; electric pumps frequently jam and burn out when particulate matter is present in the fluid contaminants.

In the closest prior art related to this invention, a pneumatic pump has a floating inlet which effectively floats with its inlet at its uppermost portion of the float. This unit floats at the interface between relatively dense underlying water and lighter overlying leachate. The specific gravity of the floating inlet is between the specific density of the lighter overlying leachate and the denser underlying water. The floating inlet floats well above the water surface with considerable "freeboard" when only water is present.

However, when this same float is immersed in the light overlying leachate, it sinks so that the floating inlet is well below the surface. Such a floating inlet is shown in U.S. Pat. No. 4,663,037.

Presuming that no pollutants are initially present, and lighter than water pollutants are being added to the surface of the water body, the freeboard of the float changes. The float gradually sinks in the lighter fluid until the inlet is submerged. The inlet then functions to collect the lighter than water fluid. When this inlet "sees" this lighter than water fluid, it conducts it via flexible tubing to the pump chamber, which is mounted below the float. Thus, the interior chamber of the pneumatic pump is flooded.

In U.S. Pat. No. 5,004,405, when the pump casing is flooded, a float interior of the pump chamber is buoyantly actuated, and a pumping cycle occurs to evacuate the flooded interior casing of the pump. This pumping cycle is typically continuously repeated so long as the interior chamber of the pneumatic pump is periodically flooded and then evacuated by pumping.

When the level of floating pollutant is reduced, the freeboard of the floating inlet increases, raising the inlet. This raising increases to the point where the pump inlet no longer "sees" fluid, and the interior chamber of the pump is no longer periodically flooded. As a direct consequence of this lack of periodic pump chamber flooding, pumping of the lighter fluid ceases.

This much is known and is closest prior art known to Applicant related to the invention that follows.

DISCOVERY OF A PROBLEM

Such preferred pneumatic pumps and their known inlets are not suitable for situations where heavier than water leachate is encountered. For example, assume that a layer of heavier than water leachate (such as those contaminants often referred to as dense non-aqueous petroleum liquids) occupies the bottom of a well, with ground water above it. This is often the case where heavy solvents have been spilled into the ground. There is no known effective way to have a pneumatically actuated pump sense the presence or absence of heavier than water leachate to warrant further pumping or to cease pumping. If the preferred pneumatic pumps for the removal of surface floating contaminants are applied to dense non-aqueous petroleum liquids, pumping of the water in the well occurs when the dense pollutants are removed.

It is to be understood that the continuation of pumping when heavier than water leachate is no longer present can be a serious disadvantage. The water pumped is usually considered a hazardous waste, and by law, must be treated to remove dissolved contaminants. Take the case where the dense non-aqueous petroleum liquids are taken to a tank for further processing and environmental neutralization. If excess amounts of non contaminated fluids are added to contaminated fluids, costs of water separation from the contaminants can increase with increased volume.

We therefore have realized the need for a pump which is specifically directed to the operation of pneumatic pumps for the extraction of heavier than water leachate such as dense non-aqueous petroleum liquids.

It will be understood that the discovery of a problem to be solved can constitute invention. In so far as we have discovered this problem, invention is claimed.

SUMMARY OF THE INVENTION

In combination with a pump, a valve for operation at the interface between underlying heavier liquid and overlying lighter liquid is disclosed. The valve includes an inlet within the heavier liquid communicated from a valve seat to a conduit which typically is connected to the inlet of a pump. A valve disc opens and closes the valve seat to admit the heavier liquid to flow to the pump. The pump is preferably pneumatic and of the type which when flooded with liquid, automatically undertakes pumping and when empty of liquid ceases pumping. A buoyant member having a specific density between that of the lighter liquid and the heavier liquid is buoyantly supported at the interface and moves with the interface. This buoyant member is connected to an assembly which actuates the valve. Where lighter liquid is predominantly present, the float sinks and closes the valve preventing pumping. Where heavier liquid is predominantly present, the float rises, opens the pump inlet to permit pumping. Specific mechanisms are present for valve operation including a surrounding casing for protecting the valve from debris and a rocker arm arrangement for valve operation.

It will be noted that the apparatus and process has distinct advantages:

(1) The apparatus and process only allows fluid to flow when the heavier product is present in sufficient quantity to be removed;

(2) The apparatus and process does not remove any of the lighter fluid;

(3) The apparatus and process does not mix the lighter fluid with the heavier fluid;

(4) The apparatus and process used to differentiate between the liquids does not require any energy source to enable the distinction;

(5) The apparatus and process can be used to remove with highly flammable, aggressive liquids without danger of damage to the invention, personnel or other property;

(6) The apparatus and process does perform equally well on conducting and nonconducting fluids.

(7) The apparatus and process can be modified to perform well on fluids with large or small differences in specific gravity;

(8) The apparatus and process will not induce any additional fluid or gas into the liquids.

(9) The apparatus and process can be made from non-flexible materials, so aggressive chemicals cannot alter its ability to perform (e.g. solvents can remove plasticizers from elastomers, so they lose their elasticity)

(10) The portion of the apparatus and process that senses the presence of a heavier liquid is also the portion of the apparatus and process that actuates a valve that removes only that liquid.

(11) The apparatus and process can operate over a wide range of submergence depths without requiring adjustment.

Positive opening and closing of the fluid inlet valve is assured by the relatively large changes of buoyant forces acting on the valve mechanism. This valve is actuated by a force equivalent to the displacement of the buoyant member at the interface of the fluid being removed. Further, the total displacement of the buoyant member is adjustable. For example, where the specific gravities of the lighter liquid and heavier liquid do not vary by a large amount, buoyant member size can be increased to corresponding increase of the buoyant force needed to operate the valve.

Thus, an apparatus and a method for removing a heavier fluid from below a lighter fluid using only the difference in specific gravity between the fluids to cause the heavier fluid to flow into a chamber without disturbing the lighter fluid is set forth.

DESCRIPTION OF THE PREFERRED EMBODIMENT

Figure 1:
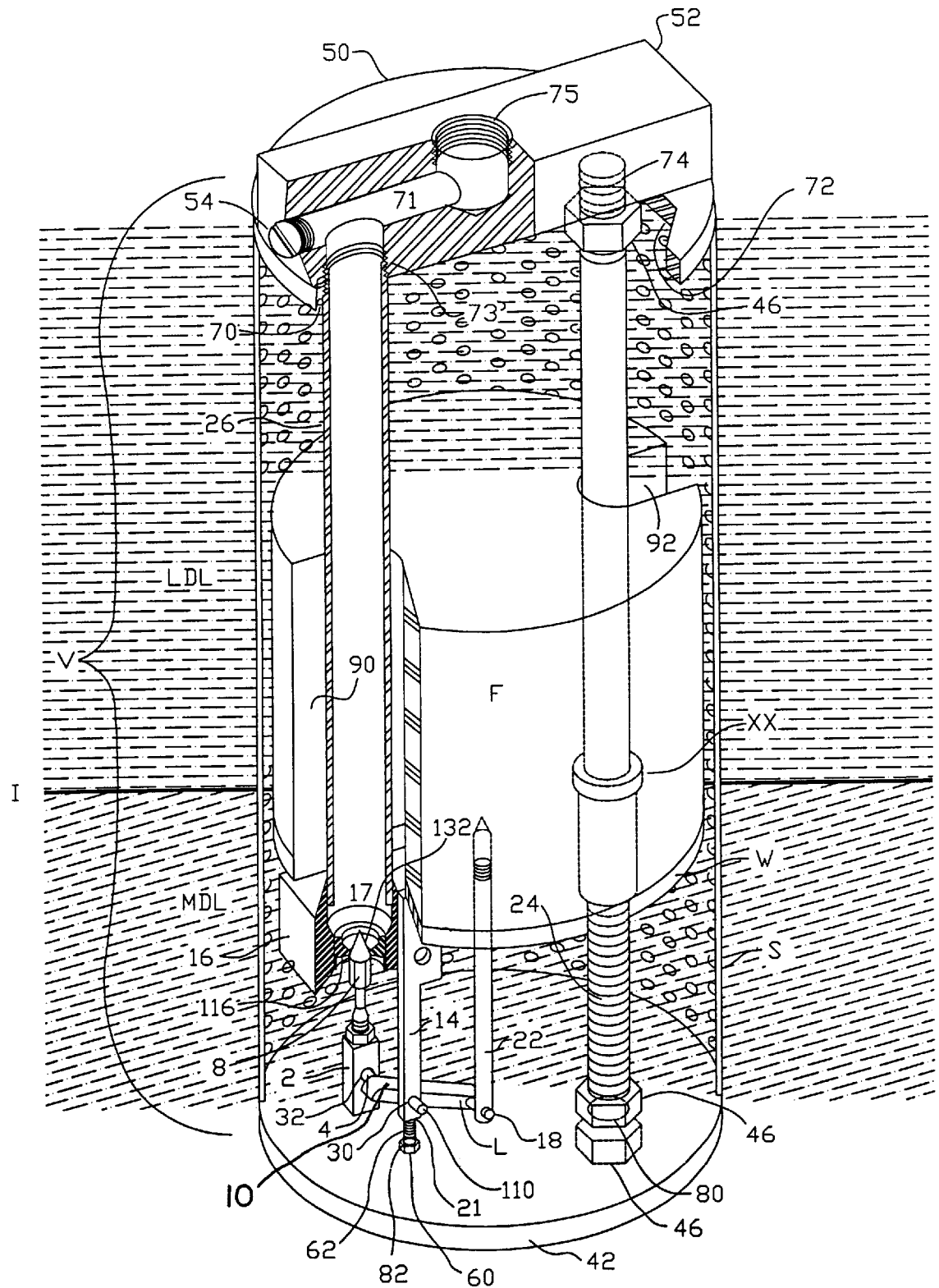
FIG. 1 is a sectioned view of a valve in accordance with this invention showing the float, lever mechanism, inlet valve and fluid conduits, an outer screen and support structure.

Referring to FIG. 1, the upper and lower ends of valve V are composed of end plates 42, 50. These end plates are connected to each other via threaded member 24. Threaded member 24 passes through opening 72 in upper plate 50 and threads solidly into manifold 52. Nut 46 on the lower side of the upper plate 50 fixes upper plate 50 rigidly to threaded member 24. The other end of threaded member 24 passes through opening 80 in the lower plate 42 and is held there with nuts 46 above and below the lower plate 42, fixing it rigidly. The upper plate 50 and the lower plate 42 are thus fixed at a set distance from each other and in fixed orientation with each other. A pipe 26 passes through opening 70 in the top plate 50 and is threaded into the inlet 73 of manifold 52. Manifold 52 has an internal passage 71 connecting its inlet 73 to its outlet 75.

The lower end of the pipe 25 threads into the outlet 17 of the valve seat block 16. Rigidly attached to both sides 10 of the valve seat block 16 are pivot supports 12, 14. (Support not shown.) Each of these pivot supports 12, 14 have a threaded hole 21 at it's lower extremity. Threaded rods 62 are threaded into the hole 21 of the two pivot supports 12, 14. These threaded rods 62 pass through openings 81, 82 (opening 81 corresponding to support 12 not shown) in the lower plate 42 and are held there by nuts 60 on the upper and lower sides of the lower plate 42.

A float F with passages 90, 92 is positioned between the pipe 26 and the threaded member 24 such that the passages 90 in the float F are aligned with and guided by the pipe 26 and the threaded member 24 as the float F travels up and down. If the material used to make float F requires an increase in its specific gravity, a weight W can be rigidly attached to the float F.

A pivot pin 110 is located near one end of lever L. It is positioned into hole 30 in pivot support block 12,14 (pivot support 12 not shown). A valve stem connecting block 2 is attached to the lever L via a pin 4 passing through a hole 32 in the connecting block 2. The valve stem 8 is connected to the connecting block 2. The valve stem 8 extends upwards into the valve seat block 16 which houses valve seat 116. The other end of lever L is attached to float rod 22 via pin 18 in the yoke 122. The other end of the float rod 22 is threaded into the bottom of the float F.

Referring to FIG. 1, when the valve assembly V is totally submerged in the less dense fluid, the float F is resting at its lowermost travel point. The end of lever L, attached to the float rod 22 is tipped downwards, while the other end of lever L is upwards, lifting the valve stem connecting block 2 and the valve stem 8 upwards, forcing the upper conical face 132 of the valve stem against the lower sealing face 130 of the valve seat 116. With the valve assembly V thus positioned, fluid cannot flow past the valve seat 116.

Figure 2:
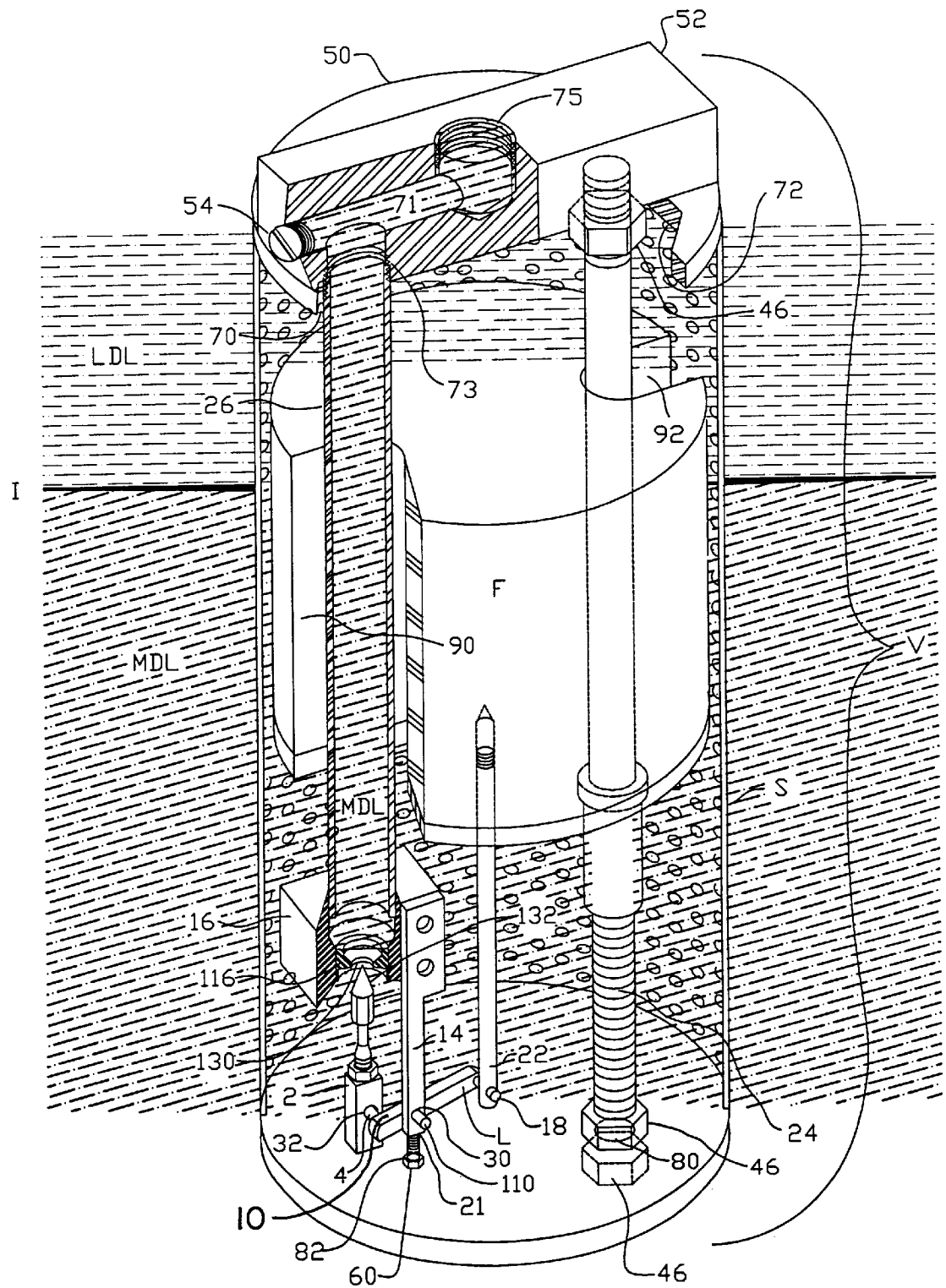
FIG. 2 illustrates the valve of FIG. 1 opened responsive to raising of the liquid interface.

Referring to FIG. 2, when the valve assembly V is submerged in the more-dense fluid, the float F travels upwards to is uppermost travel point. The end of lever L attached to the float rod 22 is tipped upwards, while the other end of lever L is downwards, pulling the valve stem connecting block 2 and the valve stem 8 downwards, moving the conical face 132 of the valve stem 8 away from the lower sealing face 130 of the valve seat 116. With the valve assembly V thus positioned, fluid flows past the valve seat 116, passes up into pipe 26 and into manifold 52. The fluid can then flow through the manifold 52 and out the manifold outlet 75. A connecting pipe 56 guides the fluid into a pump P, which removes the fluid to another location. As the more-dense fluid passes through the valve assembly V, the interface I between the less-dense and more-dense fluid will fall. As the interface I falls down the float F, the float F travels downwards, eventually moving the conical face 132 of the valve stem against the lower sealing face 130 of the valve seat 116.

Figure 3:
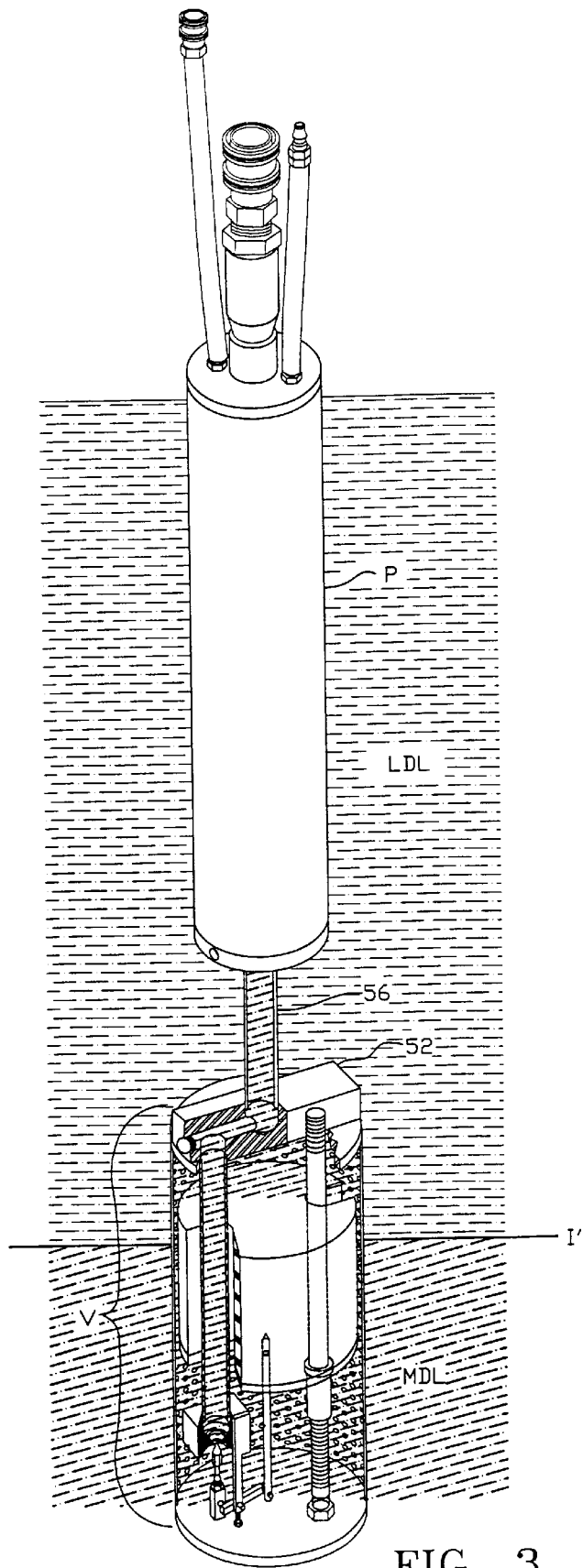
FIG. 3 illustrates a pump attached to the valve of this invention, the pump being of the preferred pneumatically operated variety.

Referring to FIG. 3, the preferred embodiment of this invention is set forth in combination with a pneumatically operated pump. Simply stated, pump P is a pneumatically operated pump such as that described and set forth in U.S. Pat. No. 5,004,405 issued to Breslin on Apr. 2, 1991 entitled "Pneumatically Powered Submersible Fluids Pumps With Integrated Controls". One example is that pump manufactured by Clean Environment Equipment of Oakland, Calif. and sold under the trademark AutoPump. Essentially the same pump is also manufactured by QED of Ann Arbor, Mich. and Ejector Systems in Addison, Ill.

Figure 4:
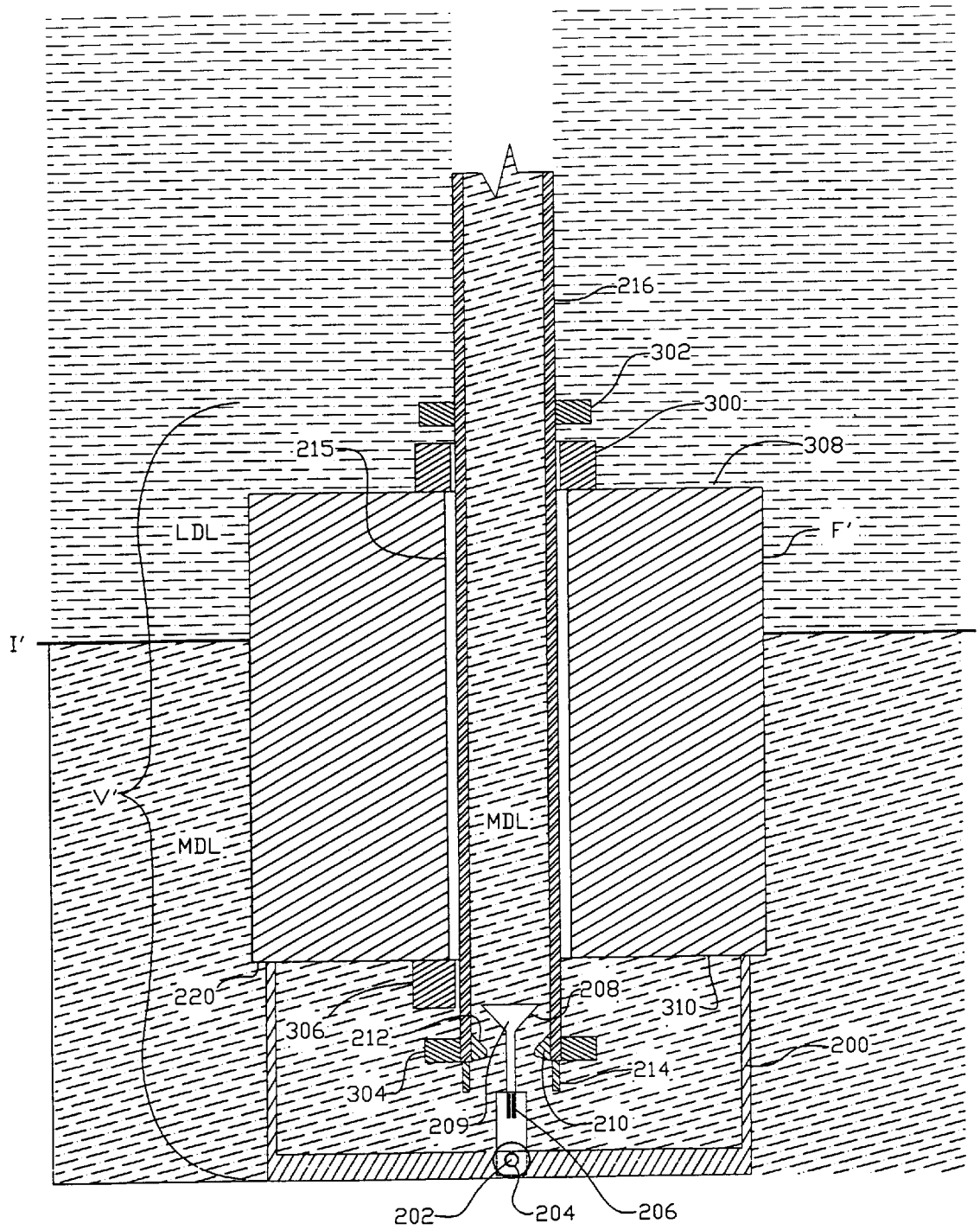
FIG. 4 includes an alternate embodiment of the valve.

Referring to FIG. 4, a device with a direct connection between the float and the inlet valve and a magnetic detent device is set forth. Valve assembly V' is comprised of a float F', which is buoyant in the more-dense liquid MDL and non-buoyant in the less-dense liquid LDL. A bracket 200 is located on and rigidly attached to the lower face 220 of the float F, a valve stem 206 pinned to the bracket 200 via pin 204, and a valve seat enclosure 214 in which a valve seat 210 is located and a pipe 216. Pipe 216 serves as the fluid passage after the fluid passes through the valve assembly 214.

With the interface I' between the less-dense liquid LDL and the more-dense liquid MDL near the lower area of the float F', the float F' is near its lowermost position. If this interface falls the float F' falls, pulling valve stem 206 downwards such that the lower sealing face 208 of the valve 209 mates against the upper sealing face 212 of the inlet valve seat 210. In this position, no fluid flows through the inlet valve 214.

When the interface I' between the less-dense liquid LDL and the more-dense liquid MDL rises due to influx of the more-dense liquid MDL, the float F' rises relative to the inlet valve 214, lifting the valve poppet 206 and moving the lower sealing face 208 of the valve 209 from the upper sealing face 212 of the inlet valve seat 210. In this position the more dense fluid MDL can flow through the inlet valve 214 and pass into the pipe 216, which can serve as passage for the more-dense fluid MDL into a pump P.

As the more-dense liquid MDL is removed from below the less-dense fluid LDF, the interface I' between the fluids will fall relative to the valve assembly V'. This will cause the float F' to travel downwards to its lowermost position which will again prevent fluid from passing through the inlet valve 214 as previously described. The cycle will continue with the influx of additional more-dense liquid MDL.

An upper magnet 300 is rigidly fixed to the upper surface of the float F'. An upper magnetically attractive plate 302 is rigidly affixed to the pipe 216 at the upper travel point of the float F'. A lower magnet 306 is rigidly fixed to the lower surface of the float F' and lower magnetically attractive plate 304 is rigidly affixed to the inlet valve 214 at the lowermost travel point of the float F'. When the float F' is in its upper or lowermost travel point it is held in place by the detent force of one of the magnets 300, 306. As the interface I' moves, the buoyant forces on the float change, but the float F' does not move until the buoyant forces exceed the retarding magnetic force. When the buoyant forces exceed the magnet force, the float F' breaks the magnetic detent and travels to its opposite extent of its travel to be captured and held by magnetic force at that position. This sudden movement causes valve 206 to open and close completely and rapidly. This prevents the float from being held in the middle of its travel due to buildup of debris or particles between the pipe 216 and the vertical bore 215 through the float F'.

The advantages of this system over prior art systems is:

(1) The apparatus and process only allows fluid to flow when the heavier product is present in sufficient quantity to be removed;

(2) The apparatus and process does not remove any of the lighter fluid;

(3) The apparatus and process does not mix the lighter fluid with the heavier fluid;

(4) The method used to differentiate between the liquids does not require any energy source to enable the distinction;

(5) The apparatus and process can be used to remove with highly flammable, aggressive liquids without danger of damage to the invention, personnel or other property;

(6) The apparatus and process performs equally well on conducting and nonconducting fluids.

(7) The apparatus and process can be modified to perform well on fluids with large or small differences in specific gravity;

(8) The apparatus and process will not induce any additional fluid or gas into the liquids.

(9) The apparatus and process can be made from non-flexible materials, so aggressive chemicals cannot alter its ability to perform (e.g. solvents can remove plasticizers from elastomers, so they lose their elasticity)

(10) The portion of the apparatus and process that senses the presence of a heavier liquid is also the portion of the invention that actuates a valve that removes only that liquid.

(11) The apparatus and process can operate over a wide range of submergence depths without requiring adjustment.

Further, this system can direct the fluid directly into a pneumatic pump for removal of the fluid in a "batch"s process. Such a pump is powered by compressed air which eliminates the sparking hazards of electrically powered pumps. Thus it is seen that the present system provides a novel, lightweight, economical, highly reliable, valving mechanism which can be easily manufactured, installed, used and removed by persons with a minimal amount of knowledge in the field of pumping fluids. The present system has the capacity to save expense in remediation of sites contaminated with a DNAPL.

While the above description contains many specificities, the reader should not construe these limitations on the scope of the apparatus and process, but merely as exemplifications of preferred embodiments thereof. Those skilled in the art will envision many other possible variations are within its scope. Some of these variations will include the shape of the float, valve lever and valve; a detent mechanism other than magnetic (e.g. constructed of an automatic resetting mechanical interference system); using only one magnet and a framework of two attractive plates on the float; having more than one fluid valve, float or lever; having more than one discharge pipe.

It will be understood that the buoyant member supported at the interface of the heavier and lighter liquid is relied upon for the operation of this invention. The combination of the pneumatic pump with this apparatus and process renders optimum the operation of the combination. While the preferred embodiment is most desired, the claims do not incorporate all of the advantages listed; the claims relate to that structure specified.

Accordingly the reader is requested to determine the scope of the apparatus and process by the appended claims and their legal equivalents, and not by the examples which have been given.

What is claimed is:

1. In combination a pump and valve for pumping heavier than water leachate from an interface between underlying heavier than water leachate and overlying water comprising:

a pneumatically operated pump having a pump casing, a pump inlet to the pump casing for receiving fluid to be pumped, and an internal pumping mechanism for evacuating the pump casing only when fluid floods the pump casing from the pump inlet;

a valve including a valve seat located to receive heavier than water leachate and a conduit communicated from a valve seat to the pump inlet of the pneumatically operated pump for flooding the pump casing;

a valve disc for opening and closing the valve seat to admit the heavier than water leachate to flow to the pneumatically operated pump;

a float placed at the interface between the underlying heavier than water leachate and the overlying water having a specific density between that of the water and the heavier than water leachate for actuating the valve disc;

means operatively connecting to the float to the valve disc to cause the valve disc to close the valve seat when water is present about the float to prevent pumping and to cause the valve disc to open when the heavier than water leachate is present about the float.

2. In the combination of claim 1 and wherein:

the means operatively connecting the float to the valve disc includes a rocker arm having the float attached to a first end, the valve disc attached to the second end, and is pivotal between the first end and the send end.

3. In the combination of claim 1 and wherein:

the valve including the valve seat and the valve disc are enclosed within a casing having a perforate portion for the inlet of fluid.

4. A valve for pumping heavier liquid from an interface between underlying heavier liquid and overlying lighter liquid comprising:

a valve including a valve seat located to receive heavier liquid and a conduit communicated from a valve seat;

a buoyant member mounted to the valve for placement at the interface between the underlying heavier liquid and the overlying lighter liquid having a specific density between that of the overlying heavier liquid and the underlying lighter liquid to buoyantly move with the interface between the overlying lighter liquid and the underlying heavier liquid; and, a float assembly operatively connected to the buoyant member and valve to open the valve when the interface rises relative to the valve and close the valve when the interface falls relative to the valve.

5. A valve for pumping heavier liquid from an interface between underlying heavier liquid and overlying lighter liquid according to claim 4 and further comprising:

the specific density of the bouyant member is half way between the specific density of the overlying liquid and the specific density of the underlying liquid.

6. A process for pumping underlying heavier liquid from under overlying lighter liquid responsive to movement of the interface between the lighter liquid and heavier liquid comprising the steps of:

providing a pump;

providing a valve including a valve seat located to receive heavier liquid and a conduit communicated from a valve seat to the pump;

providing a buoyant member mounted relative to the valve having a specific density between that of the overlying heavier liquid and the underlying lighter liquid to buoyantly move with the interface relative to the valve;

placing the buoyant member at the interface and opening the valve when the interface rises relative to the valve to cause pumping; and, closing the valve when the interface falls relative to the valve.

7. The process of claim 6 and including the step of:

providing a pneumatic pump.

8. A pump in combination:

a fluid operated pump;

a valve including a valve seat located to receive heavier liquid and a conduit communicated from a valve seat to the pump;

a buoyant member mounted to the valve for placement at the interface between the underlying heavier liquid and the overlying lighter liquid having a specific density between that of the overlying heavier liquid and the underlying lighter liquid to buoyantly move with the interface between the overlying lighter liquid and the underlying heavier liquid; and, a float assembly operatively connected to the buoyant member to open the valve when the interface rises relative to the valve and close the valve when the interface falls relative to the valve.

9. The pump of claim 6 having in further combination:

the fluid operated pump is a pneumatic pump.

10. The pump of claim 6 and wherein:

a detent mechanism is attached to the float.

* * * * *